United States Patent
Tanaka

(10) Patent No.: US 9,934,193 B2
(45) Date of Patent: Apr. 3, 2018

(54) ELECTRONIC APPARATUS

(71) Applicant: MITSUBISHI ELECTRIC CORPORATION, Tokyo (JP)

(72) Inventor: Hiroaki Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/506,625

(22) PCT Filed: Nov. 21, 2014

(86) PCT No.: PCT/JP2014/080942
§ 371 (c)(1),
(2) Date: Feb. 24, 2017

(87) PCT Pub. No.: WO2016/079871
PCT Pub. Date: May 26, 2016

(65) Prior Publication Data
US 2017/0277653 A1    Sep. 28, 2017

(51) Int. Cl.
*H01H 13/06* (2006.01)
*G06F 15/02* (2006.01)
*H04B 1/3827* (2015.01)

(52) U.S. Cl.
CPC ......... *G06F 15/0216* (2013.01); *H01H 13/06* (2013.01); *H01H 13/063* (2013.01); *H04B 1/3833* (2013.01)

(58) Field of Classification Search
CPC ............................. H01H 13/06; H01H 13/063
USPC ............................................ 200/302.1–302.3
See application file for complete search history.

(56) References Cited

U.S. PATENT DOCUMENTS

| | | | | |
|---|---|---|---|---|
| 5,824,981 A | * | 10/1998 | Suzuki | H01H 9/04 200/302.1 |
| 7,183,510 B2 | * | 2/2007 | Ami | G05G 25/04 200/302.3 |
| 7,365,281 B2 | * | 4/2008 | Yamaguchi | G06F 3/0202 200/302.1 |
| 2003/0038021 A1 | * | 2/2003 | Tsutsui | H01H 13/06 200/517 |

(Continued)

FOREIGN PATENT DOCUMENTS

| | | |
|---|---|---|
| JP | 51-27087 U | 2/1976 |
| JP | 60-193629 U | 12/1985 |

(Continued)

*Primary Examiner* — Adrian S Wilson
(74) *Attorney, Agent, or Firm* — Birch, Stewart, Kolasch & Birch, LLP

(57) ABSTRACT

An electronic apparatus includes a main body housing, a design panel to be mounted to a front surface of the main body housing, a button which is configured such that an end extends in cantilever fashion from an end portion fixed to the design panel and in which an operation part provided at the end is exposed to the outside through an opening of the design panel, a drain groove, provided around the operation part, whose an end portion in a direction in which the end is tilted due to pressing of the operation part is open, and a drain groove provided in the front surface of the main body housing on the side of the open end portion of the drain groove and leads to the outside of the main body housing.

3 Claims, 5 Drawing Sheets

(56) References Cited

U.S. PATENT DOCUMENTS

| | | | | |
|---|---|---|---|---|
| 2004/0011633 A1* | 1/2004 | Lewison | ................ | H01H 13/06 |
| | | | | 200/296 |
| 2005/0224326 A1* | 10/2005 | Oikawa | ................ | H01H 13/063 |
| | | | | 200/302.1 |
| 2006/0113173 A1* | 6/2006 | Matsumoto | ............ | G03B 17/08 |
| | | | | 200/302.2 |
| 2007/0023261 A1* | 2/2007 | Shimizu | ................ | H01H 13/06 |
| | | | | 200/4 |
| 2015/0171913 A1* | 6/2015 | Rayner | ................ | H01H 13/06 |
| | | | | 455/575.8 |

FOREIGN PATENT DOCUMENTS

| | | |
|---|---|---|
| JP | 64-5324 U | 1/1989 |
| JP | 1-92035 U | 6/1989 |
| JP | 5-31046 U | 4/1993 |
| JP | 2010-40301 A | 2/2010 |
| JP | 2010-192243 A | 9/2010 |

\* cited by examiner

ELECTRONIC APPARATUS

TECHNICAL FIELD

The invention relates to an electronic apparatus including a structure for draining liquid that enters into the inside of the electronic apparatus from around a button provided for the electronic apparatus, to the outside.

BACKGROUND ART

Pressing an operation part of a hardware button causes an internal switch of the electronic apparatus to be pressed down. The operation part is exposed to the outside of the electronic apparatus. To press down the switch accurately when the hardware button is pressed, the button and switch are disposed close to each other. Thus, water entering into the inside from around the button may easily reach the switch and a substrate on which the switch is mounted. If the water reaches the substrate, the electrical system of the substrate may short out.

To deal with this, Patent Literature 1, for example, discloses a switch apparatus comprising a structure for draining liquid, which enters into the inside, to the outside. The apparatus disclosed in Patent Literature 1 includes a knob which serves as an operation part, and a reception part constituted by a flange portion and an upright wall portion. The housing of the apparatus includes a drain passage that is opened toward the outside.

The flange portion is a flat surface extending in a direction orthogonal to the direction in which the knob is pressed, and the upright wall portion serves as a peripheral wall of the flange portion.

In the flange portion, there is formed a water reception passage extending toward a portion in which water is drained. Further, an opening is formed at an end of the water reception passage. The above-mentioned drain passage is provided at a position lower than the opening. Water entering into the inside from around the knob and received by the reception portion flows through the water reception passage, flows out from the opening of the water reception passage down to the drain passage, and then flows out to the outside.

Note that the switch apparatus described in Patent Literature 1 is a so-called direct-acting button in which an operation of pressing the nob directly moves the nob to make a tip of the nob press the switch.

In addition, the switch apparatus described in Patent Literature 1 is designed to be used in such a manner that the switch apparatus is arranged to tilt in a drainage direction. That is, since tilting the switch apparatus makes the water reception passage and drain passage tilted in the drainage direction, water received by the reception portion flows smoothly toward the drainage direction.

CITATION LIST

Patent Literature

Patent Literature 1: Japanese Patent Application Laid-open No. 2010-192243

SUMMARY OF INVENTION

Technical Problem

Meanwhile, in the field of buttons for electronic apparatus, there exists a so-called cantilever button with an end fixed and the other end extending from the fixed end in cantilever fashion. At the other end there is provided an operation part. Pressing the operation part tilts the other end, which results in pressing the switch.

Applying the drainage structure described in Patent Literature 1 to such a cantilever button does not properly drain water that enters into the inside.

For example, assume a cantilever button which is modified to include a reception portion described in Patent Literature 1. Every time when an operation part of the modified cantilever button is pressed, the other end slants down, and water received in the reception portion flows in the slanted direction. As a result, there is a possibility that water spilled out from the reception portion wets the switch or the circuit board on which the switch is mounted.

Further, as for the switch apparatus described in Patent Literature 1, if the knob is arranged to receive a press in the vertical direction, the flat surface of the flange portion needs to be horizontal. Therefore, the water is likely to remain in the reception portion.

Since the reception portion is positioned above the circuit board, in the event that vibrations or the like occurs, there is a high possibility that the remaining water spills out from the reception portion to splash over the circuit board.

Note that it is described in Patent Literature 1 that at least one of the water reception passage and the drain passage is to be slanted toward the outside when the switch apparatus is disposed in a vehicle instrument with the flat surface of the flange portion positioned horizontally. However, even when the water reception passage and the drain passage are arranged to slant, if the flat surface of the flange portion is kept horizontal, there is a possibility that the water remains on the flange portion. Further, it is impractical to change the structure of the switch apparatus itself according to the manner in which the switch apparatus is arranged.

The invention has been made to solve the problem above, and therefore it is an object of the invention to provide an electronic apparatus that is capable of properly discharging liquid entering into the inside from around the button of cantilever type to the outside.

Solution to Problem

An electronic apparatus according to the invention includes a main body housing; a panel member to be mounted on a surface of the main body housing; a button member comprising one end fixed to the panel member, another end extending from the one end in cantilever fashion, and an operation part provided at the another end, the button member being fixed to the panel member in such a manner that the operation part is exposed to the outside through an opening of the panel member; a first concave groove portion provided around the operation part, wherein at least one end of the first concave groove portion is open, the at least one end being positioned in a direction in which the another end slants when the operation part is pressed; and a second concave groove portion provided in the surface of the main body housing on a side of the open end portion of the first concave groove portion, the second concave groove portion leading to the outside of the main body housing.

Advantageous Effects of Invention

Because the invention is configured to discharge liquid in view of the operation of a button of cantilever type, the invention provides an effect that liquid entering the inside from around the button can be discharged properly to the outside.

BRIEF DESCRIPTION OF DRAWINGS

FIG. 1 illustrates views showing an electronic apparatus according to Embodiment 1 of the invention, in which

FIG. 3 illustrates views showing the back surface side of a design panel in the electronic apparatus according to Embodiment 1, in which

DESCRIPTION OF EMBODIMENTS

In the following, in order to describe the invention in greater detail, embodiments of the invention will be described according to the accompanying drawings.

Embodiment 1

Figure 1A:
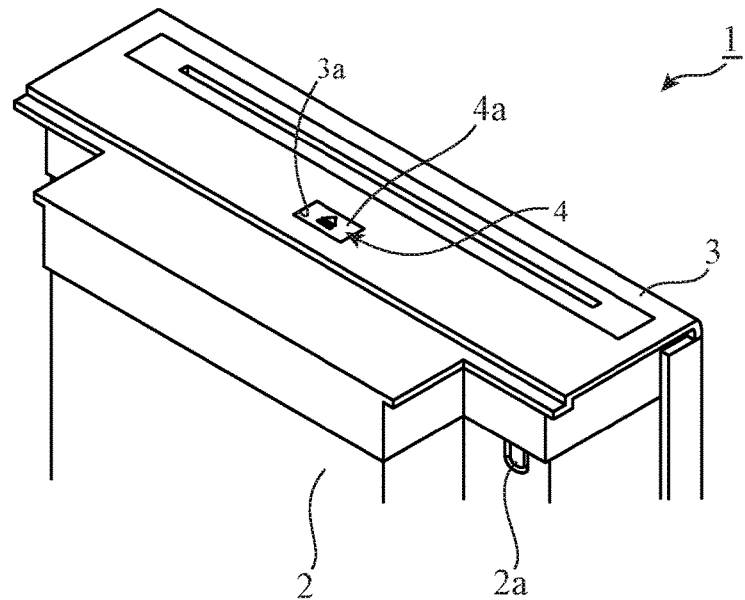
FIG. 1A is a perspective view of the front side of the electronic apparatus.
Figure 1B:
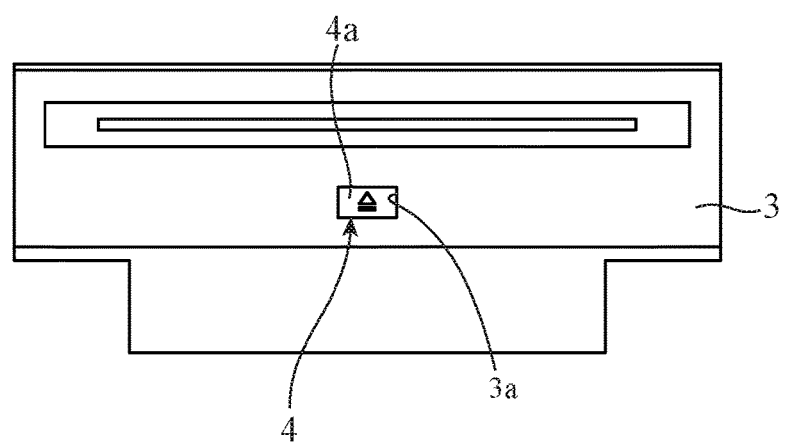
FIG. 1B is a top view of the electronic apparatus.

FIG. 1 illustrates views showing an electronic apparatus 1 according to Embodiment 1 of the invention, in which FIG. 1A is a perspective view of the front side of the electronic apparatus 1, and FIG. 1B is a front view of the electronic apparatus 1.

The electronic apparatus 1 is an embodiment of an electronic apparatus according to the invention, and electronic apparatus 1 is illustrated as a media player for installation on vehicles. The electronic apparatus 1 is provided with a drainage structure for discharging water that enters into the inside from around a button 4 to the outside.

Causes of wetting the electronic apparatus 1 include, for example, spilling a beverage, and putting a wet object on the electronic apparatus 1. According to the present invention, various types of liquid that enters into the inside of the electronic apparatus 1 can be properly discharged to the outside.

As shown in FIG. 1A, the electronic apparatus 1 includes a main body housing 2 and a design panel 3. The design panel 3 is provided with the button 4.

The main body housing 2 is a box-like housing formed of sheet metal or the like. In the main body housing 2, there are formed drain openings 2a exposed to the outside. The design panel 3 is a panel member to be mounted on the front of the main body housing 2.

In the design panel 3 there is formed an opening 3a, as shown in FIG. 1B. Through the opening 3a, an operation part 4a of the button 4 is exposed to the outside.

Note that the electronic apparatus 1 is arranged vertically in such a manner that the operation part 4a is pressed in the vertical direction.

Figure 2:
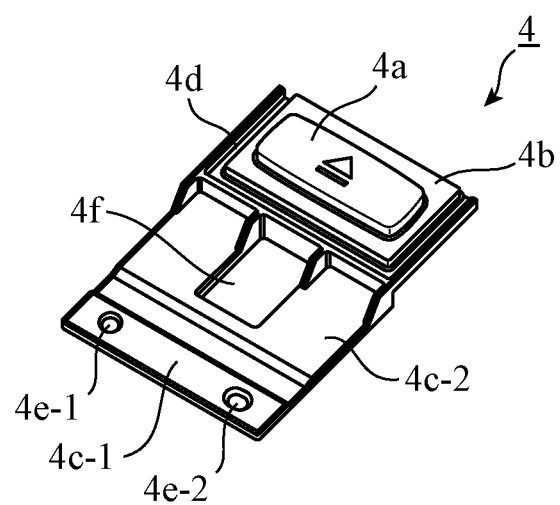
FIG. 2 is a perspective view of a button in Embodiment 1.

FIG. 2 is a perspective view of the button 4 in Embodiment 1. As shown in FIG. 2, the button 4 is a button member of cantilever type. The button 4 includes an end 4c-1 to be fixed to the design panel 3, and another end 4b which is a free end extending from the end 4c-1 via a beam 4c-2.

The operation part 4a is formed on the front side of the end 4b. Around the operation part 4a there is formed a drain groove 4d. On the back side of the end 4b there is formed a press portion for pressing a switch. The end 4c-1 is to be fixed to the design panel 3 via holes 4e-1, 4e-2. Note that a hole 4f is a hole through which a boss for supporting a circuit board, which will be described later with reference to FIG. 3, passes.

The drain groove 4d is an embodiment of a first concave groove portion in the present invention. As shown in FIG. 2, end portions of the drain groove 4d in a direction in which the end 4b slants due to depression of the operation part 4a are open.

Water entering into the inside from around the operation part 4a and received by the drain groove 4d flows in a slanting direction of the end 4b, and flows down from the open ends. As will be explained later with reference to FIG. 4, the water flowing down from the button 4 is received by a second concave groove portion, and is drained out from the drain openings 2a that are provided for the second concave groove portion.

Figure 3A:
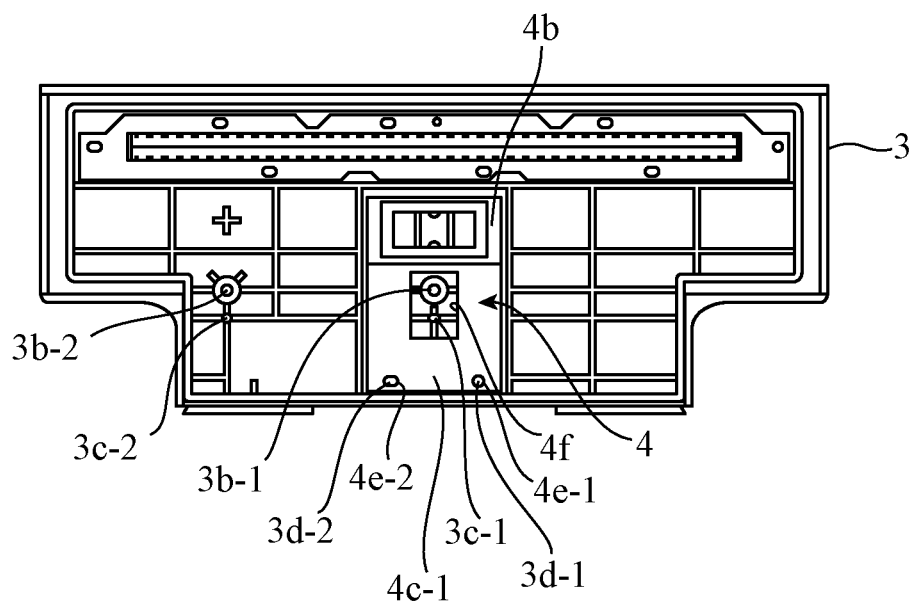
FIG. 3A shows a state in which the button is mounted to the back surface of the design panel.
Figure 3B:
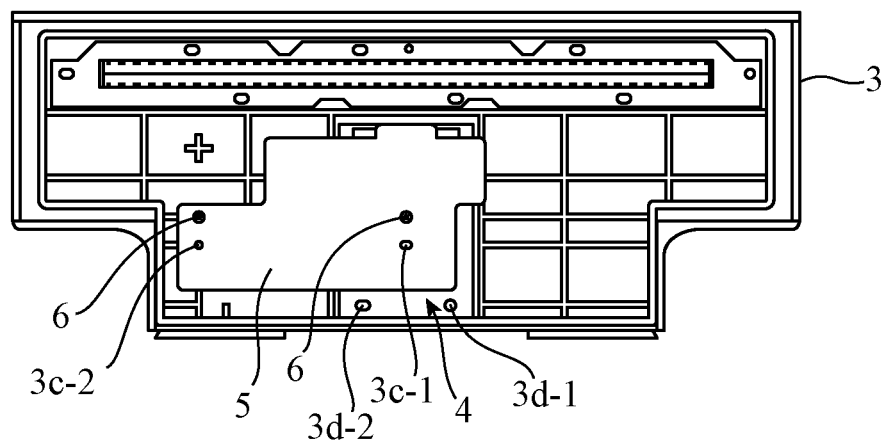
FIG. 3B shows a state in which a circuit board is further mounted to the back side of the button of FIG. 3A.

FIG. 3 illustrates views showing the back side of the design panel 3 of the electronic apparatus 1 according to Embodiment 1. FIG. 3A shows a state in which the button 4 is mounted to the back of the design panel 3, and FIG. 3B shows a state in which a circuit board 5 is further mounted to the back side of the button 4 of FIG. 3A. As shown in FIG. 3A, the button 4 is assembled from the back side of the design panel 3. By thermally welding bosses 3d-1, 3d-2 that are formed on the back of the design panel 3 in a state in which the bosses 3d-1, 3d-2 are protruding through the holes 4e-1, 4e-2 of the button 4, the end 4c-1 of the button 4 is fixed to the design panel 3.

The circuit board 5 is a circuit board on which the switch that is pressed with the button 4 is mounted. On the back of the design panel 3 there are formed bosses 3b-1, 3b-2 with a female threaded bore and bosses 3c-1, 3c-2 for positioning. When the button 4 is assembled to the back surface of the design panel 3, the bosses 3b-1 and 3c-1 are exposed through the hole 4f of the button 4. In the circuit board 5 there are formed holes corresponding to bosses at a corresponding position. As shown in FIG. 3B, the circuit board 5 is fastened to the back of the design panel 3 with screws 6.

Figure 4:
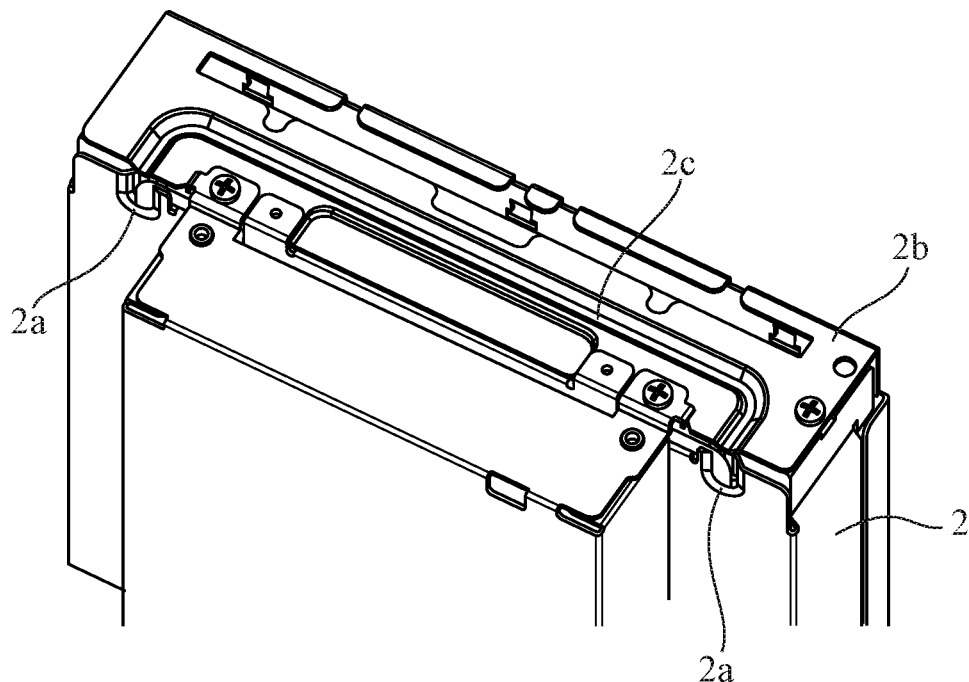
FIG. 4 is a perspective view showing a main body housing of the electronic apparatus according to Embodiment 1.

FIG. 4 is a perspective view showing the main body housing 2 of the electronic apparatus 1 according to Embodiment 1.

The design panel 3 is mounted to a front surface 2b of the main body housing 2. As shown in FIG. 4, in the front surface 2b there is formed a drain groove 2c extending in the width direction of the front surface 2b. The drain groove 2c leads to the drain openings 2a. The drain groove 2c corresponds to the second concave groove portion in the present invention.

As shown in FIG. 1A, the drain openings 2a are exposed to the outside with the design panel 3 mounted to the front surface 2b, and water received by the drain groove 2c flows out from the drain openings 2a.

Figure 5:
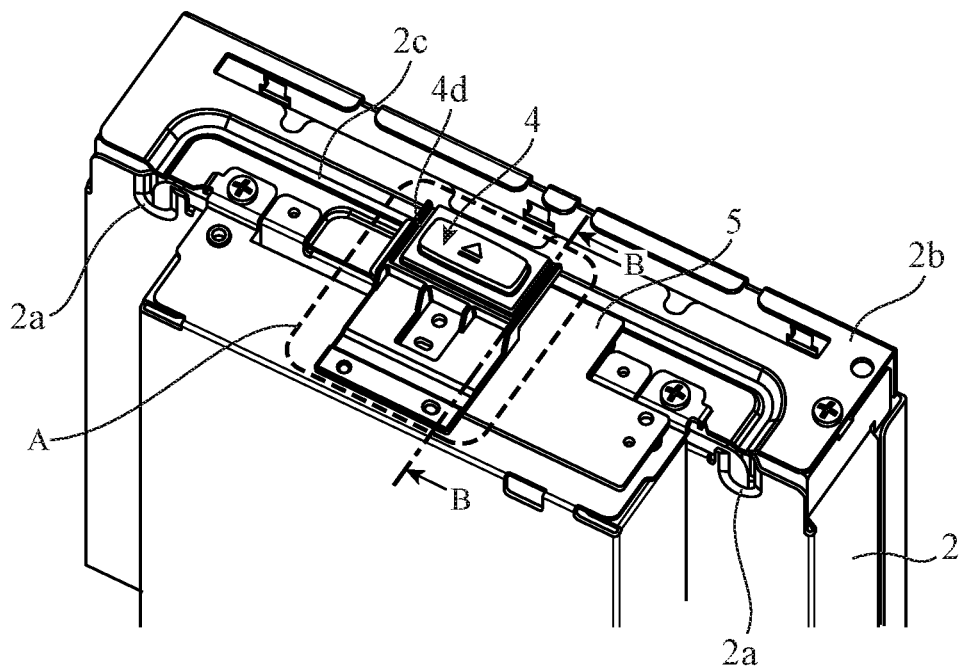
FIG. 5 is a view showing a drainage structure of the electronic apparatus according to Embodiment 1.

FIG. 5 is a view showing a drainage structure of the electronic apparatus 1 according to Embodiment 1, and is a view in which the depiction of the design panel 3 is removed from the electronic apparatus 1 shown in FIG. 1A. Note that the end of the button 4 indicated in the portion A is actually fixed to the back of the design panel 3.

Figure 6A:
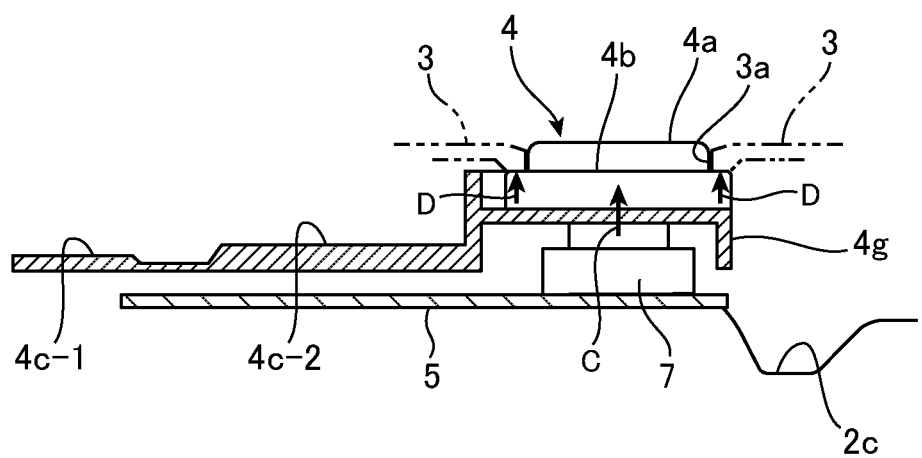
FIG. 6 illustrates cross-sectional views obtained by cutting the drainage structure of the electronic apparatus according to Embodiment 1 along the line B-B in FIG. 5, in which a state before the button is pressed and a state after the button is pressed are shown FIG. 6A and FIG. 6B, respectively.
Figure 6B:
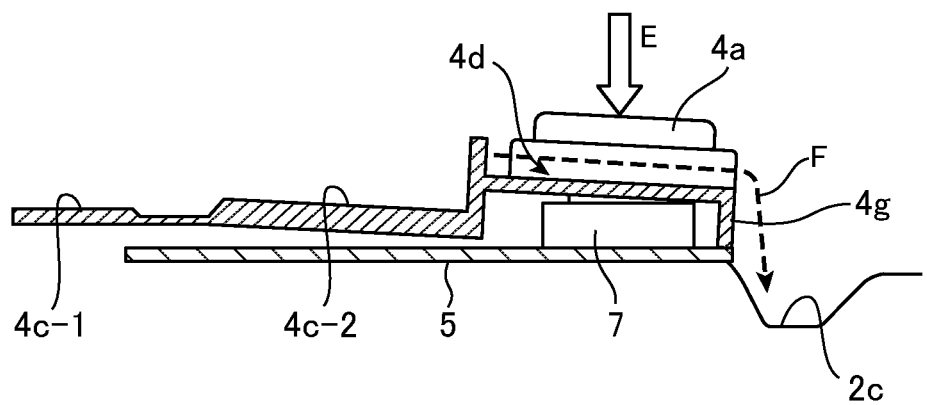

FIG. 6 illustrates cross-sectional views obtained by cutting the drainage structure of the electronic apparatus 1 according to Embodiment 1 along the line B-B of FIG. 5. A state before pressing the button 4 and a state after pressing the button 4 are shown in FIGS. 6A and 6B respectively. Note that, in FIG. 6A, the design panel 3 and the opening 3a are depicted with broken lines.

As shown in FIG. 5, the drain groove 2c is formed on the side of the open end portion of the drain groove 4d, and in the front surface 2b of the main body housing 2. With this structure, water flowing down from the open end portion of the drain groove 4d flows through the drain groove 2c, and flows out from the drain openings 2a in the end.

The back surface of the end 4b serves as a press portion for pressing a switch 7.

That is, as shown in FIG. 6B, when the operation part 4a is pressed, the end 4b and beam 4c-2 slant with the end 4c-1 acting as pivot point, and then the back surface of the end 4b turns on or turns off the switch 7 by pressing the switch 7.

Note that a stopper 4g that extends from the end 4b toward the circuit board 5 is formed in the button 4 in order to prevent the switch 7 from being pressed excessively. Thus, even when the operation part 4a is pressed strongly downward, the stopper 4g touches the circuit board 5 to restrict undue pressing of the switch 7.

Note that it is necessary to adjust the operation sensitivity of the button 4 properly because it is inconvenient that the switch 7 is operated when the operation part 4a of the button 4 is only touched or the switch 7 is not operated even when the operation part 4a is pressed. Accordingly, in many of press switches such as the switch 7, an amount of depression is set stepwise. For example, although the switch is not operated when the switch is pressed by an initial amount of depression, the switch is operated when the switch is further pressed in the state in which the switch is pressed down by the initial amount. That is, it is possible to adjust the operation sensitivity of the button by pressing the switch within the range of the initial amount of depression in advance.

In the present invention, countermeasures against wetting that utilize such switch characteristics are taken.

For example, as shown in FIG. 6A, the button 4 is arranged in such a manner that the switch 7 is pressed by the initial amount of depression of the switch 7 before the operation part 4a is pressed. In this state, the end 4b of the button 4 receives a reaction force C from the switch 7, and the button 4 is pressed against the periphery of the opening 3a of the design panel 3 due to a biasing force D based on the reaction force C.

Thus, since the inside is sealed from the outside at the portion making pressure contact before the operation part 4a is pressed, water does not enter into the inside even when the design panel 3 is wetted.

The electronic apparatus 1 is arranged vertically in such a manner that the operation part 4a is pressed in the vertical direction E.

In this arrangement, the front surface 2b of the main body housing 2, the panel surface of the design panel 3, and the end 4b of the button 4 horizontally mounted to the panel surface are all horizontal. Accordingly, when the operation part 4a is pressed, the end 4b of the button 4 slants in the vertical direction E.

When the operation part 4a is pressed in a state in which the design panel 3 is wetted, the end 4b of the button 4 slants and moves away from the opening 3a to form a gap, and water enters into the inside through the gap.

Since the end portion of the drain groove 4d in the slanting direction of the end 4b is open, water having entered into the inside flows immediately down to the drain groove 2c along the passage F.

Note that, as shown in FIG. 6B, the drain groove 2c is located at a position lower than the circuit board 5 in the vertical direction, and the concave groove of the drain groove 2c is wider in width and deeper than the drain groove 4d, and hence the water does not splash on the circuit board 5. The water having flowed into the drain groove 2c flows out from the drain opening 2a.

Since the electronic apparatus 1 is vertically arranged, water flows into the drain groove 2c with potential energy corresponding to the height between the drain groove 2c and the drain groove 4d. Due to the potential energy, flows of water that proceeds toward the drain openings 2a are produced, and hence the water is less likely to remain in the drain groove 2c.

Note that since the circuit board 5 is positioned above the drain groove 2c and there is a gap in a height direction, the possibility that the water splashes on the circuit board 5 is extremely low even when the water remains in the drain groove 2c and when vibrations are applied.

As explained above, the electronic apparatus 1 according to Embodiment 1 includes the main body housing 2; the design panel 3 to be mounted to the front surface 2b of the main body housing 2;

the button 4 including the end 4c-1 fixed to the design panel 3, the end 4b extending from the end 4c-1 in cantilever fashion, and the operation part 4a provided at the end 4b, the button 4 being fixed to the design panel 3 in such a manner that the operation part 4a is exposed to the outside through the opening 3a of the design panel 3; the drain groove 4d that is provided around the operation part 4a, wherein the ends of the drain groove 4d are open, the ends being positioned in a direction in which the end 4b slants when the operation part 4a is pressed; and the drain groove 2c that is provided in the front surface 2b of the main body housing 2 on the side of the open ends of the drain groove 4d and leads to the outside of the main body housing 2.

Even when water enters into the inside from around the button 4, i.e., from the gap between the operation part 4a and the opening 3a, since the end 4b of the button 4 is slanted by pressing the operation part 4a, the water flows in the drain groove 4d toward the slanting direction, and then flows down to the drain groove 2c from the open ends of the drain groove 4d. Since the drain groove 2c leads to the drain openings 2a, the water flows out from the drain openings 2a.

Thus, it is possible to properly discharge the liquid, such as water, entering into the inside from around the button 4 to the outside of the electronic apparatus 1.

In addition, according to Embodiment 1, in the state before the operation part 4a is pressed to operate the switch 7, the button 4 is pressed against the periphery of the opening 3a of the design panel 3 due to the reaction force from the switch 7. With this structure, it is possible to seal the inside from the outside at the portion making pressure contact before the operation part 4a is pressed, and hence it is possible to prevent the entry of water even when the design panel 3 is wetted.

Further, according to Embodiment 1, the electronic apparatus 1 is arranged vertically in such a manner that the operation part 4a is pressed in the vertical direction. With this arrangement, it is possible to flow the water toward the slanting direction of the end 4*b* of the button 4 caused by pressing the operation part 4*a* and direct the water to the drain openings 2*a*.

Note that combination, modification or omission of parts of embodiments described above may be made within the scope of the invention.

INDUSTRIAL APPLICABILITY

Since the electronic apparatus according to the invention is capable of properly discharging liquid, such as water, that enters into the inside from around the button to the outside of the electronic apparatus, the electronic apparatus may be preferable for a vehicle electronic apparatus whose panel surface provided with a button may be wetted due to eating or drinking by the passenger.

REFERENCE SIGNS LIST 1 electronic apparatus
2 main body housing
2*a* drain opening
2*b* front surface
2*c*, 4*d* drain groove
3 design panel
3*a* opening
3*b*-1, 3*b*-2, 3*c*-1, 3*c*-2, 3*d*-1, 3*d*-2 boss
4 button
4*a* operation part
4*b*, 4*c*-1 end
4*c*-2 beam
4*e*-1, 4*e*-2, 4*f* hole
4*g* stopper
5 circuit board
6 screw
7 switch

The invention claimed is:

1. An electronic apparatus comprising:
a main body housing;
a panel member to be mounted on a surface of the main body housing;
a button member comprising one end fixed to the panel member, another end extending from the one end in cantilever fashion, and an operation part provided at the another end, the button member being fixed to the panel member in such a manner that the operation part is exposed to the outside through an opening of the panel member;
a first concave groove portion provided around the operation part, wherein at least one end of the first concave groove portion is open, the at least one end being positioned in a direction in which the another end slants when the operation part is pressed; and
a second concave groove portion provided in the surface of the main body housing on a side of the open end portion of the first concave groove portion, the second concave groove portion leading to the outside of the main body housing.

2. The electronic apparatus according to claim 1, wherein the button member is pressed against a periphery of the opening of the panel member by a reaction force from the switch, in a state before the operation part is pressed to operate a switch.

3. The electronic apparatus according to claim 1, wherein the electronic apparatus is arranged vertically in such a manner that the operation part is pressed in the vertical direction.

* * * * *